(12) United States Patent
Saxena et al.

(10) Patent No.: US 11,481,150 B2
(45) Date of Patent: Oct. 25, 2022

(54) READ MODIFY WRITE OPTIMIZATION FOR VIDEO PERFORMANCE

(71) Applicant: WESTERN DIGITAL TECHNOLOGIES, INC., San Jose, CA (US)

(72) Inventors: Vishwas Saxena, Karnataka (IN); Lalit Mohan Soni, Karnataka (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 104 days.

(21) Appl. No.: 16/837,786

(22) Filed: Apr. 1, 2020

(65) Prior Publication Data

US 2021/0311660 A1  Oct. 7, 2021

(51) Int. Cl.
*G06F 3/06* (2006.01)
*G06F 16/13* (2019.01)
*G06F 12/06* (2006.01)

(52) U.S. Cl.
CPC .......... *G06F 3/0659* (2013.01); *G06F 3/0611* (2013.01); *G06F 3/0679* (2013.01); *G06F 12/06* (2013.01); *G06F 16/13* (2019.01); *G06F 2212/7202* (2013.01)

(58) Field of Classification Search
CPC ...... G06F 12/06; G06F 3/0611; G06F 3/0679; G06F 3/0659; G06F 16/13; G06F 2212/7202
See application file for complete search history.

(56) References Cited

U.S. PATENT DOCUMENTS

| | | | |
|---|---|---|---|
| 8,285,956 B2 | 10/2012 | Ozdemir | |
| 8,458,435 B1 | 6/2013 | Rainey, III et al. | |
| 9,116,625 B2 | 8/2015 | Palmer | |
| 9,466,383 B2 | 10/2016 | Peng et al. | |
| 9,830,103 B2 | 11/2017 | Pundir et al. | |
| 2008/0126680 A1* | 5/2008 | Lee | G06F 3/064 |
| | | | 711/103 |

(Continued)

OTHER PUBLICATIONS

Im, Soojun, and Dongkun Shin. "ComboFTL: Improving performance and lifespan of MLC flash memory using SLC flash buffer." Journal of Systems Architecture 56.12 (2010): 641-653. (Year: 2010).*

*Primary Examiner* — Kalpit Parikh
(74) *Attorney, Agent, or Firm* — ArentFox Schiff LLP

(57) ABSTRACT

Aspects of a storage device are provided which reduce write amplification by minimizing data flushes from cache to SLC blocks during RMW operations. A memory of the storage device includes a first memory location of one or more single-level cells and a second memory location of one or more multiple-level cells. A controller of the storage device receives first data associated with a first range of logical addresses and second data associated with a second range of logical addresses. During a RMW operation of the first data, the controller determines whether the first range overlaps with the second range, and stores or flushes the second data in the first memory location when an overlap is determined. The controller stores or writes the second data in the second memory location when an overlap is not determined. Accordingly, data flushing to the single-level cells is minimized when no overlap is determined.

19 Claims, 10 Drawing Sheets

(56) References Cited

U.S. PATENT DOCUMENTS

| | | | |
|---|---|---|---|
| 2015/0143030 A1* | 5/2015 | Gorobets | G11C 11/5621 |
| | | | 711/103 |
| 2016/0342545 A1 | 11/2016 | Arai et al. | |
| 2018/0113642 A1* | 4/2018 | Huen | G06F 3/0635 |
| 2019/0220218 A1* | 7/2019 | Deshe | G06F 3/0685 |

\* cited by examiner

READ MODIFY WRITE OPTIMIZATION FOR VIDEO PERFORMANCE

BACKGROUND

Field

This disclosure is generally related to electronic devices and more particularly to storage devices.

Background

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

Flash storage devices generally have a minimum length of data that a controller may manage when reading from and writing to flash memory. This minimum length of data may be referred to as a flash management unit (FMU). For instance, a typical flash storage device may have an FMU size of 4 KB. Moreover, blocks of flash memory may have page sizes which are larger than the FMU size. For example, a single die of flash memory may include a page size of 32 KB within a block of single-level cells.

When the flash storage device receives a write command for data that is unaligned with the FMU (for example, data less than 4 KB in the above example), the flash storage device generally performs a read-modify-write (RMW) operation to align the write command with the FMU size prior to writing the data to a page of memory. For example, if the flash storage device receives a write command for 512 bytes of data, the flash storage device may perform RMW by reading a page (e.g. 32 KB) from the memory, modifying or aligning the data with the FMU size (e.g. by merging the 512 bytes with 3.5 KB of data to result in 4 KB), and writing a page to the memory including the modified or aligned data.

SUMMARY

One aspect of a storage device is disclosed herein. The storage device includes a memory and a controller. The memory includes a first memory location and a second memory location, where the first memory location comprises one or more single-level cells and the second memory location comprises one or more multiple-level cells. The controller is configured to receive first data associated with a first range of logical addresses and second data associated with a second range of logical addresses from a host device, and to determine whether the first range of logical addresses overlaps with the second range of logical addresses. The controller is further configured to store the second data in one of the first memory location or the second memory location during a RMW operation of the first data based on the determination.

Another aspect of a storage device is disclosed herein. The storage device includes a memory and a controller. The memory includes a first memory location and a second memory location, where the first memory location comprises one or more single-level cells and the second memory location comprises one or more multiple-level cells. The controller is configured to receive first data associated with a first range of logical addresses and second data associated with a second range of logical addresses from a host device, and to determine whether the first range of logical addresses overlaps with the second range of logical addresses. The controller is further configured to store the second data in the first memory location during a RMW operation of the first data when at least one address in the first range of logical addresses overlaps with the second range of logical addresses, and to store the second data in the second memory location during the RMW operation of the first data when the first range of logical addresses does not overlap with the second range of logical addresses.

A further aspect of a storage device is disclosed herein. The storage device includes a memory and a controller. The memory includes a first memory location and a second memory location, where the first memory location comprises one or more single-level cells and the second memory location comprises one or more multiple-level cells. The controller is configured to receive first data associated with a first range of logical addresses and second data associated with a second range of logical addresses from a host device, and to determine whether the first range of logical addresses overlaps with the second range of logical addresses by comparing one or more FMUs of the first data with one or more sequential patterns of the second data. The controller is further configured to store the second data in one of the first memory location or the second memory location during a RMW operation of the first data based on the determination.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
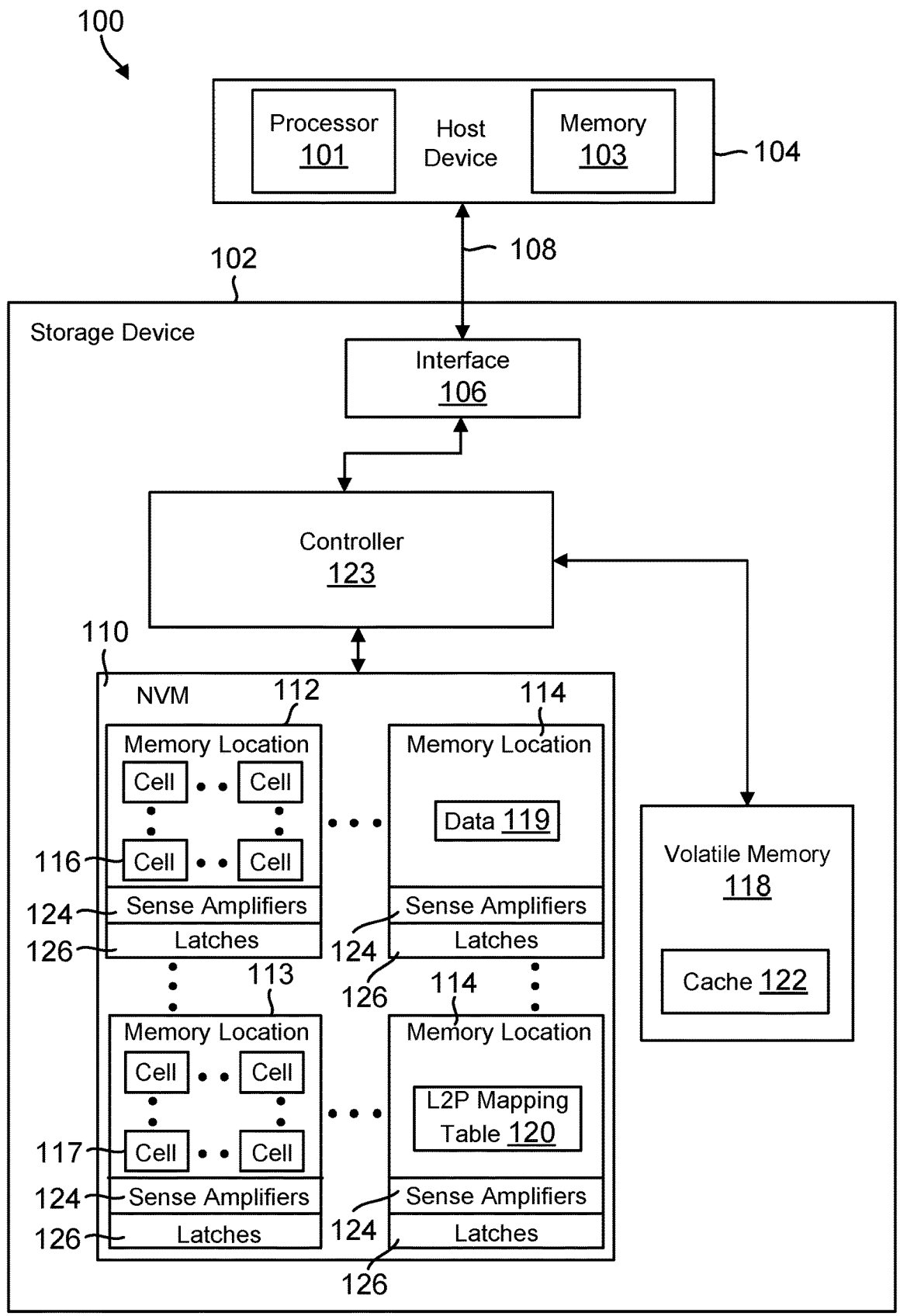
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

When a storage device writes video data to the flash memory, the storage device may write data to one or more blocks of multiple-level cells (MLC blocks), such as a triple-level cell (TLC) block. A TLC block may include lower pages, middle pages, and upper pages, and the storage device may simultaneously write to multiple groups of lower, middle, and upper pages in the TLC block. For instance, the storage device may include 4 Flash Interface Modules (FIMs) that may each write data in parallel to a group of lower, middle, and upper pages. Thus, in an example assuming a 32 KB page size in a SLC block of a die, the storage device may write data in lengths of 384 KB to a TLC block (e.g. four groups of lower, middle, and upper 32 KB pages). This size is intended to be an example; other data write lengths for a block are possible depending on the block type (e.g. MLC, TLC, quadruple-level cell (QLC), penta-level cell (PLC), etc.), the SLC page size, and the number of FIMs in the storage device.

When a storage device receives video data from a host (e.g. based on a Video Performance Grade (VPG) standard pattern), the video data may include sequential data and random data. The sequential data may include one or more allocation units (AUs) of video data, and the random data may include File Allocation Table (FAT) data associated with the AUs for updating a FAT of the storage device. As an example, AUs may each include between 2 MB and 32 MB of video data, while FAT updates may include 512-1536 bytes of data. Furthermore, the AU's may be divided into recording units (RUs). Each RU may have a typical size of 16K, for example.

The storage device stores data received from the host device in a cache until the data accumulates to the size of the data write length. Thus, in the example of a TLC block with a 384 KB write length, the storage device may accumulate 384 KB of data from the host device in cache before writing the data to the TLC block. The data may include AU data, which the storage device may route to the TLC block after 384 KB of data is accumulated. The data may also include FAT update data, which the storage device may separately route to an SLC random block when the size of the FAT data matches the size of the FMU (e.g. 8 sectors or 4K).

However, FAT updates may frequently span less than four sectors in length (e.g. 1 to 3 sectors typically), where each sector may include a number of bytes (e.g. 512 bytes) associated with a logical address. As a result, the size of the FAT update data may be less than the size of the FMU. Accordingly, the storage device may perform RMW to align the FAT updates to the FMU size. For example, assume that the storage device receives FAT data associated with a logical address, in the middle of a range of logical addresses corresponding to an FMU size, e.g. sector 2 in a range of sectors 0-7. In such case, the storage device may perform RMW by reading a page from a SLC random block (e.g. 32 KB) including a head portion and a tail portion in the FMU range (e.g. sectors 0-1 and sectors 3-7, respectively), modifying the FAT data to include the head and tail portions, and then writing the modified FAT data (e.g. sectors 0-7) to a page in the SLC random block.

Yet, performing RMW may cause a write ordering issue with respect to the data accumulated in the cache. For example, if any AU data in the cache is associated with the same sectors or logical addresses corresponding to the head portion, the tail portion, or the page read during RMW, there is a possibility the FAT updates may improperly point to previous data due to an altered order of writes (e.g. the FAT update came after the new data, but is written before the new data). To address this issue, the storage device may flush the accumulated data in the cache to the SLC random block prior to performing RMW. In this way, when the storage device reads the page from the SLC random block, the storage device may read the new data rather than the old data when performing RMW.

While the above approach may resolve the write ordering issue by preventing the FAT update from being written before the new data, this approach may also result in write amplification since the cache is excessively flushed to the SLC random block during every RMW operation. For instance, the SLC random blocks may quickly become full, requiring data in the single-level cells to be relocated to triple-level cells to make space available for more cache flushing and FAT update storage.

To resolve this problem, the present disclosure allows the storage device to determine whether the range of logical addresses (or sectors) read during RMW overlap with the range of logical addresses of accumulated data in the cache.

The storage device may optimally search for overlap by comparing one or more sequential patterns of the logical address range for the RMW page with one or more sequential patterns of the logical address range for the accumulated data. If any overlap is detected, the storage device may determine that AU data associated with the same logical addresses corresponding to the FMU or RMW page is in the cache, and therefore the storage device may flush the accumulated data in the cache before reading the page during RMW. However, if no overlap is detected, the storage device may determine that no AU data associated with the same logical addresses corresponding to the FMU or RMW page is in the cache, and therefore the storage device refrains from flushing the accumulated data in the cache before reading the page during RMW. In this way, excessive flushing for RMW, and therefore write amplification, may be reduced.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

As shown in the exemplary embodiment of FIG. 1, the storage device 102 includes non-volatile memory (NVM) 110 for non-volatilely storing data received from the host 104. The NVM 110 can include, for example, flash integrated circuits, NAND memory (e.g., SLC memory, MLC memory, TLC memory, QLC memory, PLC memory, or any combination thereof), or NOR memory. The NVM 110 may include a plurality of memory locations 112, 113 which may store system data for operating the storage device 102 or user data received from the host for storage in the storage device 102. For example, the NVM may have a cross-point architecture including a 2-D NAND array of memory locations 112, 113 having n rows and m columns, where m and n are predefined according to the size of the NVM. In the illustrated exemplary embodiment of FIG. 1, each memory location 112, 113 may be a block 114 including multiple cells 116, 117. The cells 116, 117 may be single-level cells, multiple-level cells, triple-level cells, quadruple-level cells, and/or penta-level cells, for example. For instance, cells 116 may be single-level cells, while cells 117 may be multiple-level cells (e.g. triple-level cells). Other examples of memory locations 112, 113 are possible; for instance, each memory location may be a die containing multiple blocks. Moreover, each memory location may include one or more blocks in a 3-D NAND array. Moreover, the illustrated memory locations 112, 113 may be logical blocks which are mapped to one or more physical blocks.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a buffer (e.g. a write buffer or a read buffer) for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116, 117 of any of the memory locations 112, 113. As an example, FIG. 1 illustrates data 119 being stored in one memory location, although the data may be stored in different memory locations. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112, 113 in the NVM where data is stored. While FIG. 1 illustrates a single L2P mapping table 120 stored in one of the memory locations 112, 113 of NVM to avoid unduly obscuring the concepts of FIG. 1, the L2P mapping table 120 in fact may include multiple tables stored in one or more memory locations of NVM.

Figure 2:
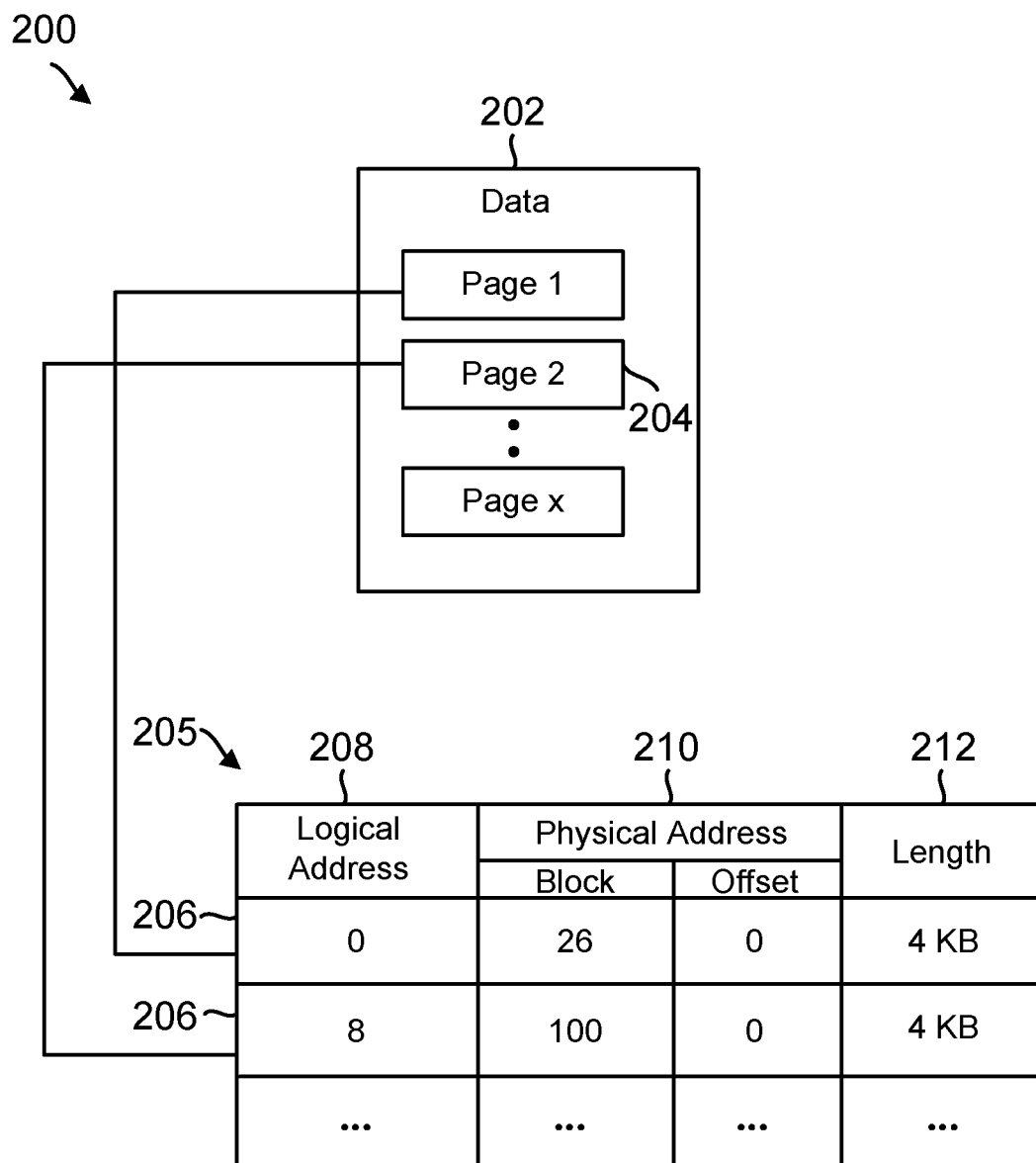
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 may store data temporarily as it is being written to, or read from, the NVM 110. For example, the cache 122 may store data received from the host device 104 until a certain length of data is accumulated for writing to one or more pages of the memory locations 112, 113. Similarly, the cache 122 may store data read from the NVM until a certain length of data is accumulated for transferring to the host device.

The cache 122 may also include entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112, 113 in NVM where data is being read.

The NVM 110 includes sense amplifiers 124 and data latches 126 connected to each memory location 112, 113. For example, the memory location 112, 113 may be a block including cells 116, 117 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116, 117 of the memory location, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116, 117 of the memory location, the controller 123 stores the programmed data in the data latches 126, and the data is subsequently transferred from the data latches 126 to the cells 116, 117.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116, 117 of the various memory locations 112, 113 in response to a read command. For example, the controller 123 may read the data 119 by activating the sense amplifiers 124 to sense the data from cells 116, 117 into data latches 126, and the controller 123 may receive the data from the data latches 126. The controller 123 is also configured to program data into one or more of the cells 116, 117 in response to a write command. For example, the controller 123 may write the data 119 by sending data to the data latches 126 to be programmed into the cells 116, 117. The controller 123 is further configured to access the L2P mapping table 120 in the NVM 110 when reading or writing data to the cells 116, 117. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116, 117 located at the mapped physical addresses.

The controller 123 may be further configured to access the memory locations 112, 113 in parallel. For example the memory locations 112, 113 may be blocks 114 stored on different dies of the NVM 110, and each die may be connected to the controller 123 by its own data bus. The controller may read or write data to the cells 116, 117 on the different dies simultaneously over the multiple data buses. Additionally, the controller 123 may be configured to refrain from accessing the memory locations 112, 113 in parallel, and may instead access the memory locations serially. For example, the controller may determine to read or write data to the cells 116, 117 of a memory location in sequence rather than simultaneously over the multiple data buses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112, 113 in the NVM 110 of storage device 102 for storing the data. The controller 123 stores the L2P mapping in the NVM (and the cache 122) to map a logical address associated with the data to the physical address of the memory location 112, 113 allocated for the data. The controller also stores the length of the L2P mapped data. The controller 123 then stores the data in the memory location 112, 113 by sending it to one or more data latches 126 connected to the allocated memory location, from which the data is programmed to the cells 116, 117.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112, 113 specified by the physical addresses by sensing the data using the sense amplifiers 124 and storing them in data latches 126 until the read data is returned to the host 104 via the host interface 106.

Figure 3:
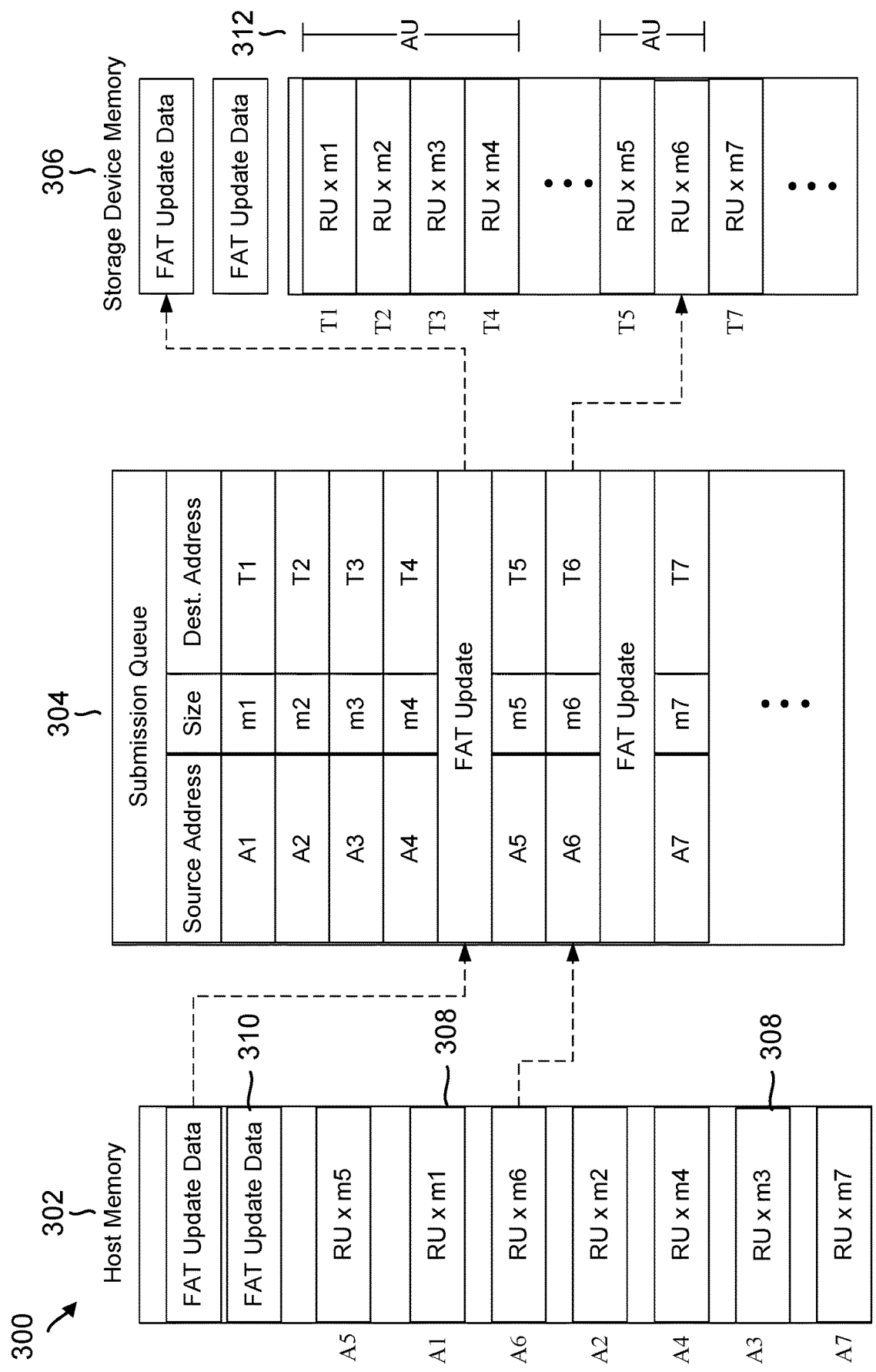
FIG. 3 is a conceptual diagram illustrating an example of video data transmitted from the host device to the storage device of FIG. 1.

FIG. 3 illustrates an example 300 of data (e.g. a video pattern) received from a host memory 302 that is transmitted according to a submission queue 304 for storage in a storage device memory 306. The host memory 302 may correspond to memory 103, and the storage device memory 306 may correspond to NVM 110 in FIG. 1. The host memory 302 may include RUs 308 and FAT update data 310. Each RU 308 may include a sequence of video data captured by the host device, and each FAT update data 310 may include file system updates for the storage device corresponding to the RUs. The RUs and FAT updates may be arranged in the submission queue 304, and once a certain length of video data corresponding to an AU 312 has been queued (e.g. 32 MB), the AU 312 including the RUs 308 and the associated FAT update data 310 are transmitted to the storage device where they are ultimately stored in the storage device memory 306. For example, if the RUs stored at addresses A1, A2, A3, A4 have a combined length (m1+m2+m3+m4) of one 32 MB AU, these RUs are transmitted with one FAT update to the storage device memory to be stored respectively at addresses T1, T2, T3, T4 (and another address for the FAT update). Similarly, if the next RUs stored at addresses A5 and A6 have a combined length (m5+m6) of one 32 MB AU, these RUs are transmitted with another FAT update to the storage device memory to be stored respectively at addresses T5, T6 (and another address for the FAT update). The transmissions may repeat for multiple AUs and FAT updates.

Figure 4:
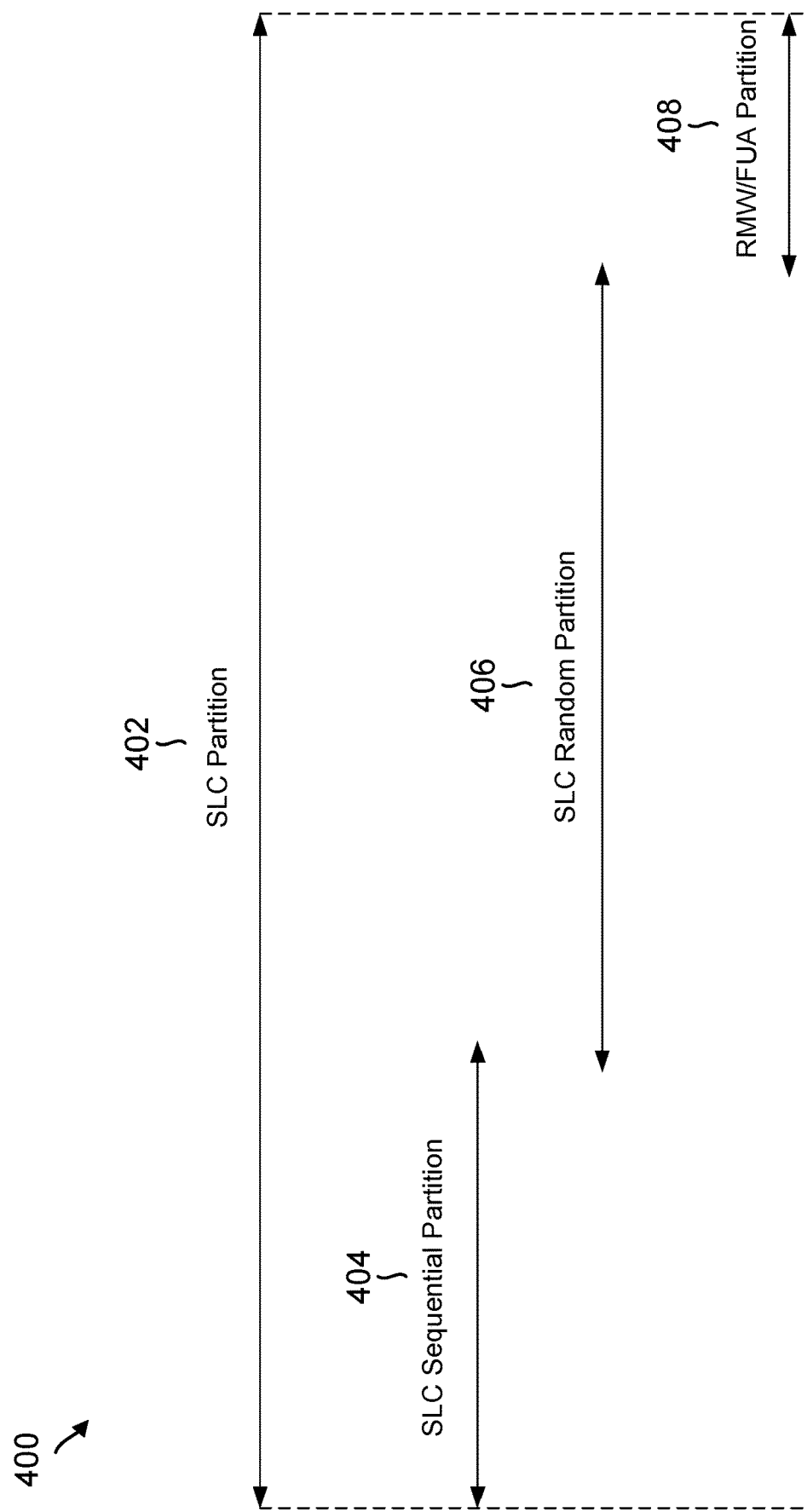
FIG. 4 is a conceptual diagram illustrating an example of a single-level cell (SLC) partition in the memory of the storage device of FIG. 1.

FIG. 4 illustrates an example 400 of a SLC partition 402 in a memory of a storage device that may store sequential AU data (e.g. one or more AUs 312 of FIG. 3) and FAT updates (e.g. FAT update data 310 of FIG. 3). SLC partition 402 may be a partition of the NVM 110 of FIG. 1, which may include one or more memory locations 112 of single-level cells that store data 119 received from the host device 104. The SLC partition 402 may be further divided into other partitions, including a SLC sequential partition 404, a SLC random partition 406, and a RMW/Forced Unit Access (FUA) partition 408. For instance, the controller may write RUs 308 of one or more AUs 312 to the SLC sequential partition 404, FAT update data 310 to the SLC random partition 406, and data associated with RMW to the RMW/FUA partition 408. Each partition may be a predetermined size; for example, SLC sequential partition 404 may be 1 GB in size, SLC random partition 406 may be 5 GB in size, and RMW/FUA partition 408 may be 1 GB in size, resulting in SLC partition 402 being a total of 7 GB in size.

Referring back to FIG. 1, when data 119 (e.g. RUs 308 and FAT update data 310) is received from the host device 104, the controller 123 may accumulate the received data in the cache 122 before transferring it to one of the memory locations 112, 113. For example, memory location 113 may be a TLC block in which the controller may write 384 KB of accumulated RU data at one time, while memory location 112 may be a SLC block (e.g. SLC partition 402) in which the controller may write FAT update data as well as sequential AU data. However, if the data 119 to be written is less than the size of an FMU (e.g. FAT update data 310 between 1 and 3 sectors in length), the controller may flush the accumulated data in the cache 122 to the SLC partition 402 to prevent out-of-order writes when performing RMW, as described below with respect to FIGS. 5 and 6.

Figure 5:
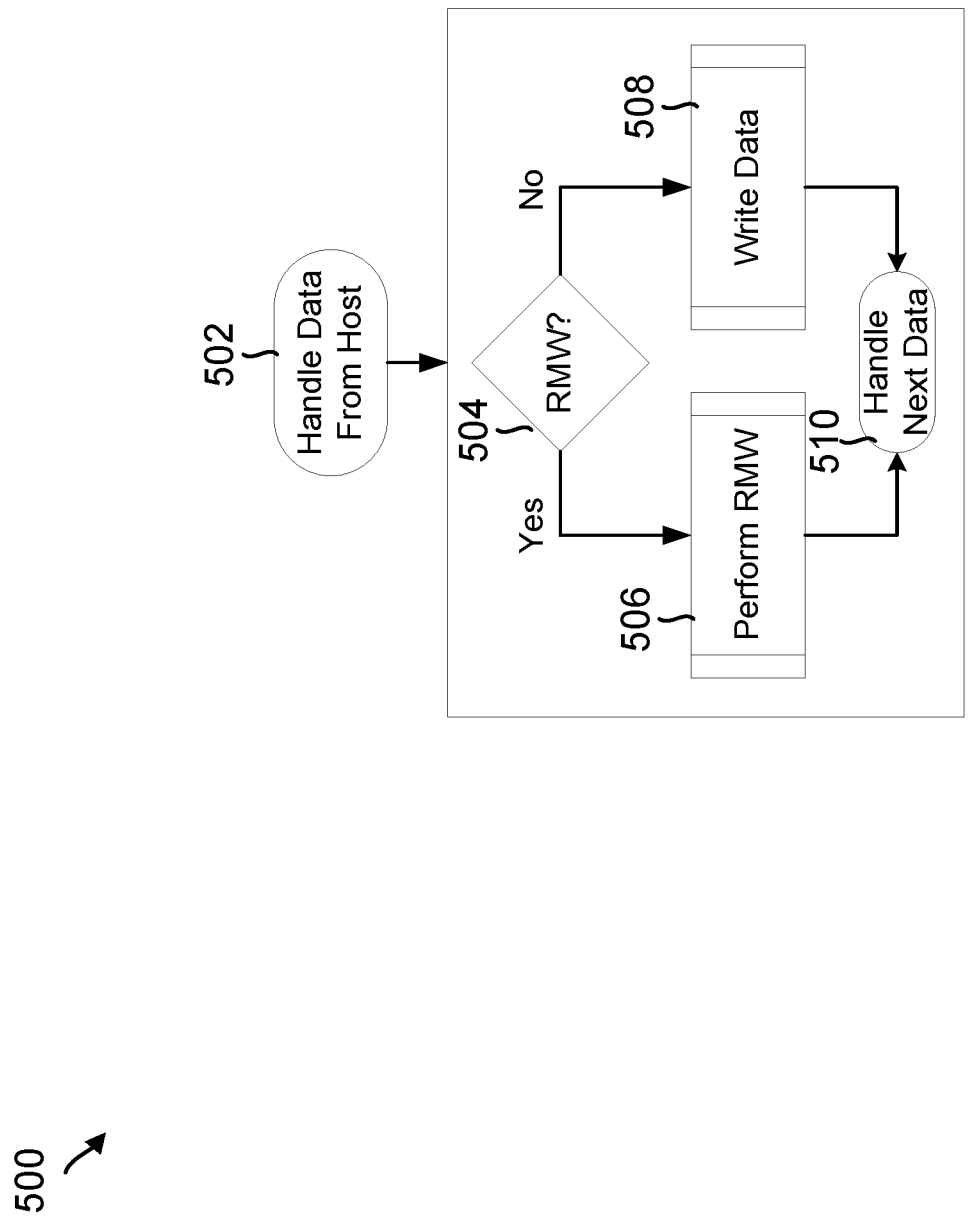
FIG. 5 is a flow chart illustrating a method of performing RMW.

For instance, FIG. 5 illustrates an example 500 of a RMW operation performed by a controller of the flash storage device (e.g. controller 123 of FIG. 1). As represented by block 502, the controller may handle data from a host device. For example, the controller 123 may receive AU data and FAT data from host device 104 via interface 106 and handle an amount of the data corresponding to a page or write length of a single die (e.g. 32 KB). Subsequently, as represented by block 504, the controller may determine whether a RMW operation should be performed. For example, the controller 123 may check whether an amount of FAT data (e.g. 1-3 sectors) within the 32 KB of data being handled is less than the size of the FMU of the controller (e.g. 8 sectors). If the data is less than the FMU size, then as represented by block 506, the controller may perform RMW. For example, the controller 123 may read a page of data from the NVM 110 including a head and/or tail portion of the FAT data, modify the FAT data to align with the FMU size, and write the 32 KB of data being handled including the aligned FAT data to the NVM 110 (e.g. to SLC partition 402). Otherwise, if the data is not less than the FMU size, then as represented by block 508, the controller may write the data without performing RMW (e.g. by writing the 32 KB of data being handled to the NVM 110). Afterwards, the controller may handle the next amount of data (e.g. 32 KB), as represented by block 510.

Figure 6:
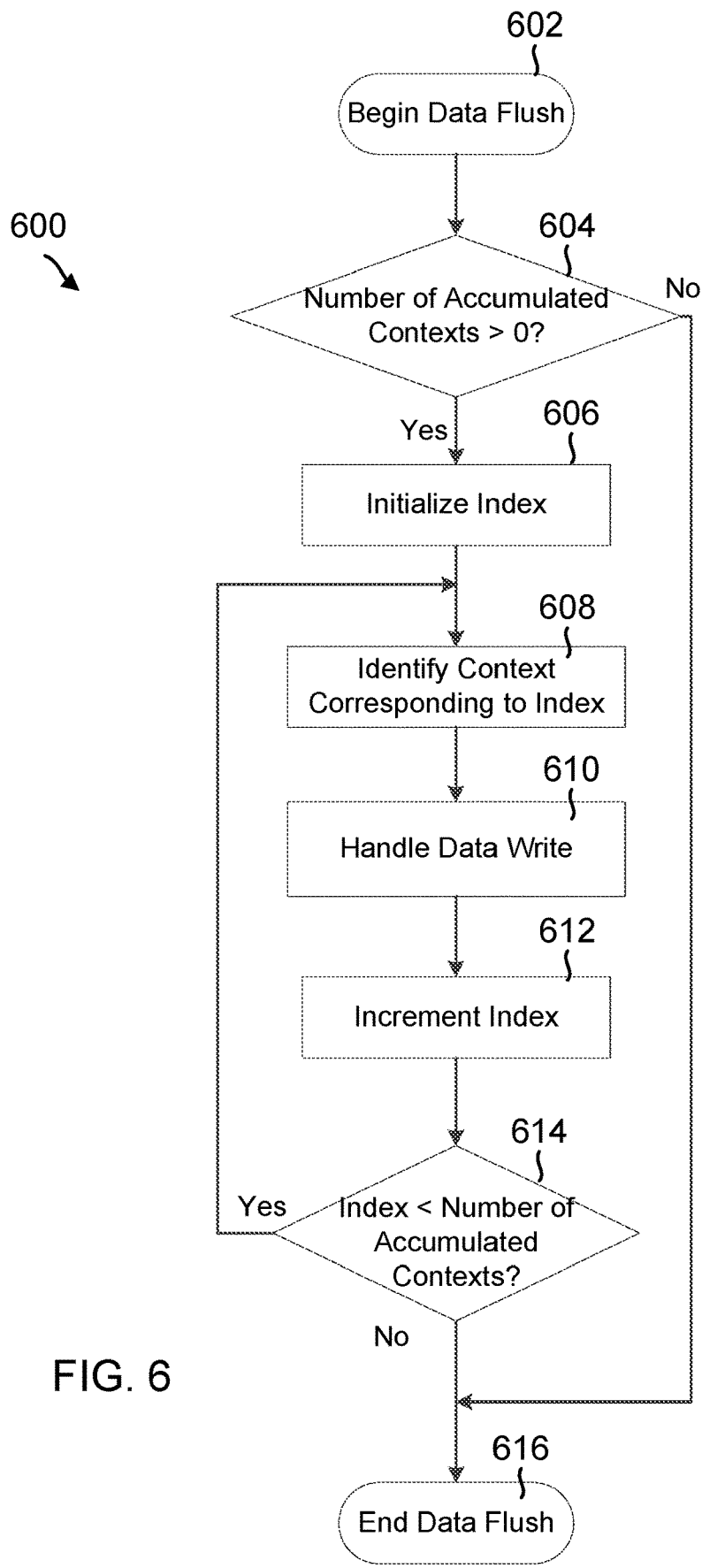
FIG. 6 is a flow chart illustrating a method of flushing data to memory while performing RMW.

However, such RMW operation may result in a write ordering problem depending on the data in the cache as described above, and therefore the controller may flush the accumulated data in the cache when performing RMW to address the write ordering problem. FIG. 6 illustrates an example 600 of a data flushing operation performed by a controller of the flash storage device (e.g. controller 123 of FIG. 1). As represented by block 602, the controller may begin a data flush. For example, the controller 123 may flush accumulated data in the cache 122 to the SLC partition 402 before reading the head and/or tail portions during the RMW process described with respect to FIG. 5. Accordingly, as represented by block 604, the controller may determine a number of accumulated data contexts in the cache, where each data context represents an amount of data corresponding to a page or write length of a single die. For example, assuming a page or write length of 32 KB, then if 352 KB of data is currently accumulated in the cache 122, the number of accumulated data contexts would be 11 (i.e. 11×32 KB). Thus, in this example, the accumulated data may be written at 11 times in 32 KB increments (or pages) to the SLC partition. In other examples, other numbers of accumulated data contexts may be identified depending on page size/write lengths and the amount of accumulated data in the cache.

If the number of accumulated data contexts is determined to be greater than 0 (i.e. there is accumulated data in the cache), then as represented by block 606, the controller may initialize an index, for instance by setting it to 0, and then as represented by block 608, the controller may identify the data context corresponding to the current index. For example, if 352 KB of data is currently accumulated in the cache 122 (with 11 data contexts), then the first 32 KB may correspond to index 0, the second 32 KB may correspond to index 1, etc. Next, as represented by block 610, the controller may handle the data write. For example, the controller 123 may fetch the first data context (e.g. 32 KB) in the cache 122 and write that data to SLC partition 402. The controller may then increment the index, as represented by block 612, and then the controller may determine as represented by block 614 if the updated index is still less than the number of accumulated contexts (i.e. there is still data remaining in the cache). If there is still data remaining, the controller may repeat the above process and continue to write data to the SLC partition 402 until there is no accumulated data remaining in the cache. When no data remains, then as represented by block 616, the controller may end the data flush.

Figure 7A:
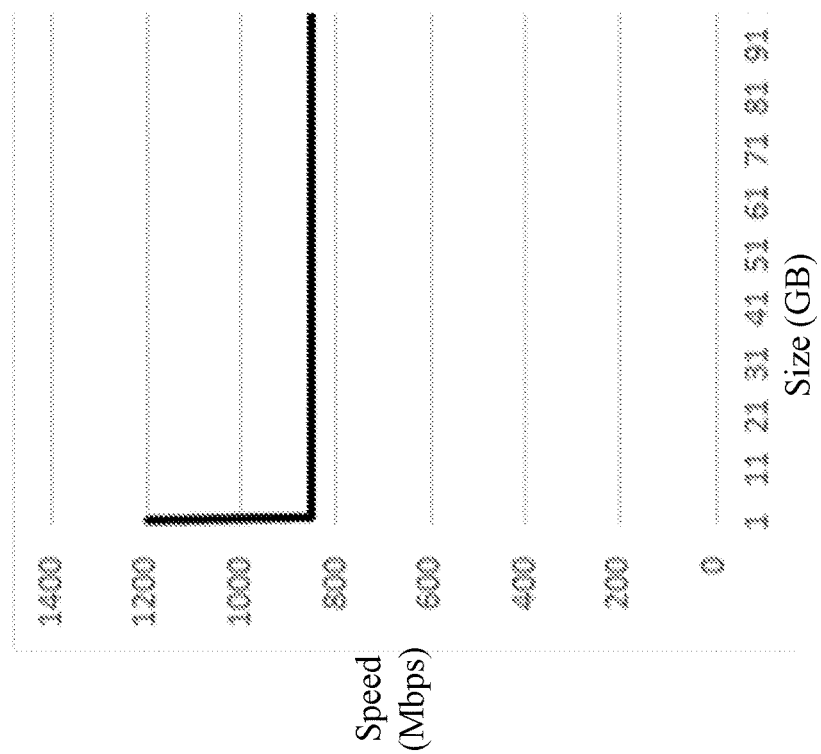
FIGS. 7A and 7B are charts illustrating examples of video write performance of the storage device of FIG. 1.

However, such excessive flushing of data to the SLC partition to prevent write ordering problems during RMW may result in increased write amplification. For example, in typical video patterns, the controller may receive AU data including RUs spanning 2 MB each, as well as one FAT data update (e.g. 1 sector in size). If 352 KB of this AU data (17% of 2 MB) is accumulated in cache and flushed to the SLC partition 402 as described above, then assuming a SLC random partition size of 6 GB, the SLC random partition may become full after 35 GB of AU data is written (i.e. after 17% of 35 GB, or 6 GB, is flushed to the single-level cells). To provide more space in the SLC random partition, the controller may perform garbage collection (GC) to free the blocks by, for example, repeatedly writing three SLC blocks of data to one TLC block and then erasing the three SLC blocks. However, such repeat GC while writing AU data may result in significant reduction of video write performance, as illustrated for example in the chart 700 of FIG. 7A. For instance, FIG. 7A illustrates an example where the excessive flushing and resulting GC causes video write performance to decrease from 1200 Mbps down to a constant of 116 Mbps after 35 GB of data has been written.

Therefore, to avoid write amplification caused by repetitive GC due to excessive flushing of accumulated data in the cache to the SLC partition, the controller may minimize the aforementioned flushing process by determining whether the logical address range(s) of MLC data in cache overlaps with the logical address range(s) of RMW data or FMU data in the NVM. MLC data may include the AU data (e.g. RU 308) that is received from the host device 104 and accumulated in cache 122 to be written as a page (e.g. 384 KB in size) to memory location 113 (e.g. a TLC block or other MLC block including cells 117). RMW data may include the page of data including the head portion and/or tail portion that the controller may read to modify data unaligned with a size of the FMU during the RMW operation. FMU data may include the data corresponding to the size of the FMU including the head portion and/or tail portion (e.g. eight sectors or 4 KB of data) within RMW data. There may be multiple FMU data within a single RMW data. For instance, there may be 8 FMUs (e.g. 4 KB each) within one RMW data of 32 KB.

Figure 7B:
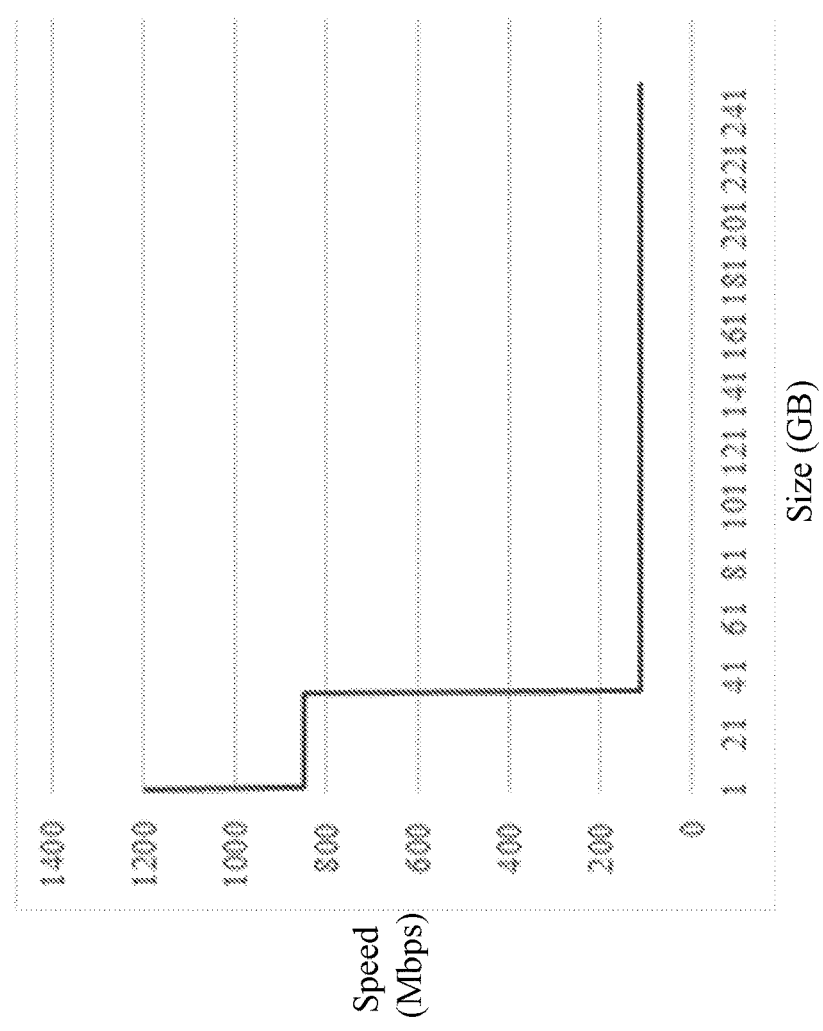

The controller may determine overlap by comparing a logical range of RMW data, or a logical range of each FMU data within RMW data, with a single, sequential pattern (logical range) or with multiple, separate sequential patterns (multiple logical ranges) of MLC data. If the controller determines there is overlap between the logical address ranges, the controller may flush the MLC data from the cache to the memory location 112 (e.g. a SLC block including cells 116, or SLC partition 402) when performing RMW to prevent potential write ordering issues. However, if the controller determines there is no overlap between the logical address ranges, the controller may not flush the MLC data in the cache to the memory location 112 or SLC partition since no write ordering issues may arise. Accordingly, the controller may sequentially store the accumulated data in the memory location 113 (e.g. a TLC block or other MLC block including cells 117) once the data amounts to the corresponding write length (e.g. 384 KB for a TLC write size). In this way, improved sequential read performance and lower write amplification may be achieved, as illustrated for example in the chart 750 of FIG. 7B. For instance, FIG. 7B illustrates an example where video write performance may remain at a constant of 850 Mbps as a result of the reduced (or eliminated) flushing and consequently avoided GC.

Figure 8A:
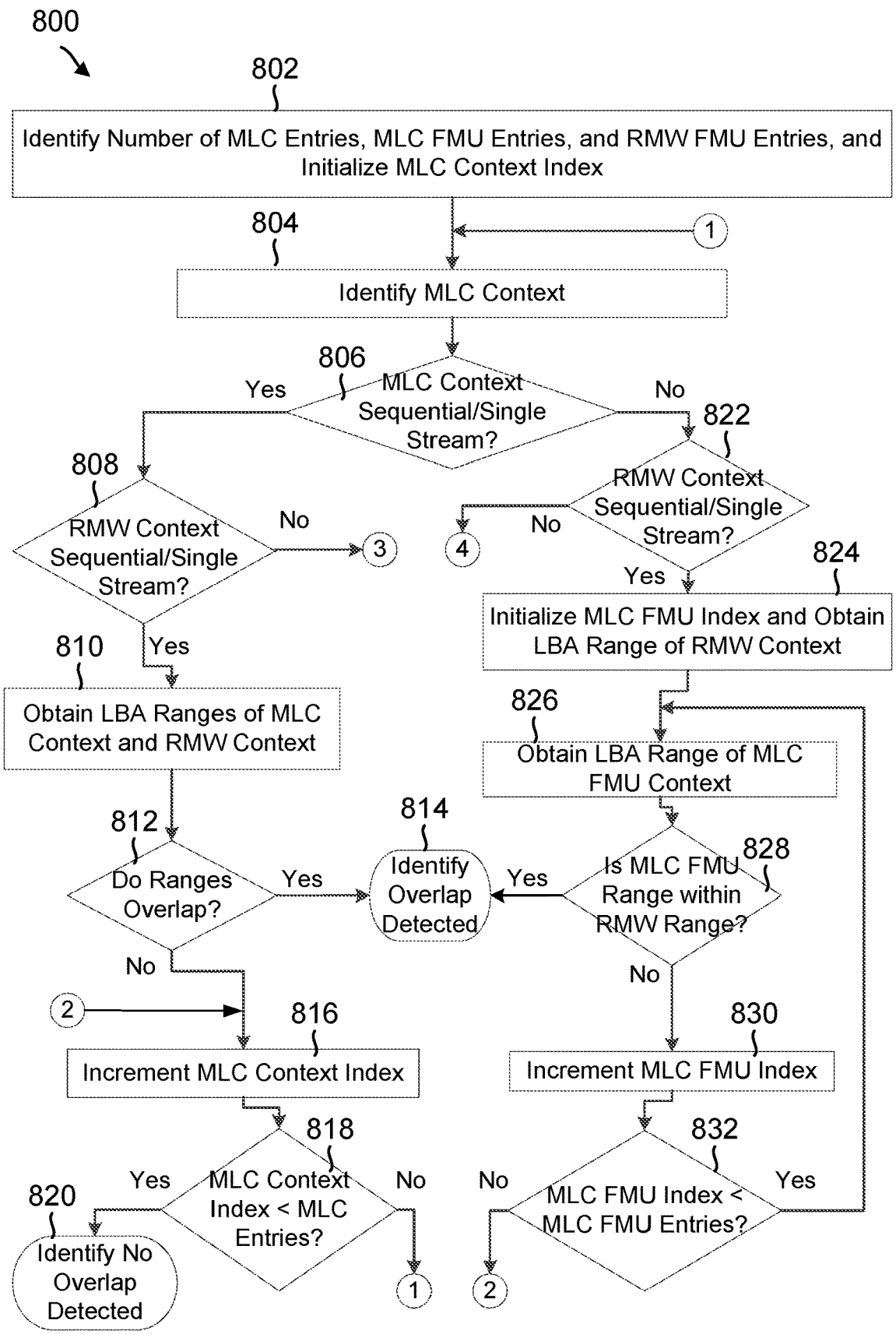
FIGS. 8A and 8B are a flow chart illustrating an exemplary method of determining logical address range overlap during a RMW operation by the storage device of FIG. 1.
Figure 8B:
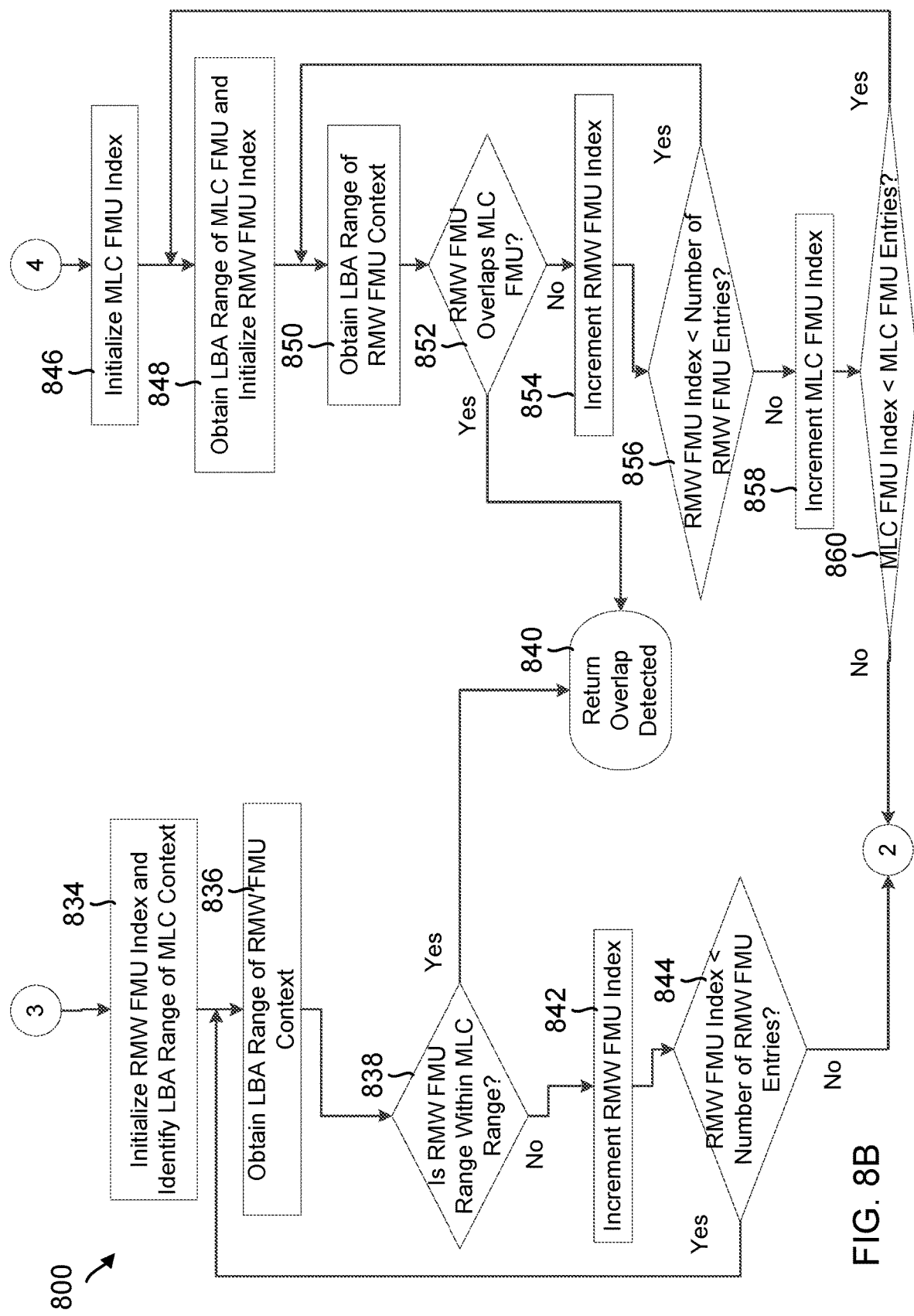

FIGS. 8A and 8B illustrate an example flow chart 800 of a method of determining overlap of logical address ranges between MLC data and RMW/FMU data. For example, the method can be carried out in a storage device 102 such as the one illustrated in FIG. 1. Each of the steps in the flow chart can be controlled using the controller as described below (e.g. controller 123), or by some other suitable means.

Referring to FIG. 8A, as represented by block 802, the controller may identify a number of MLC entries, MLC FMU entries, and RMW FMU entries. For example, assuming that the accumulated data 119 in the cache 122 to be written to an MLC block (e.g. a TLC block) is currently 352 KB at the time RMW is performed, and assuming that the page size for a single write to an SLC block is 32 KB, the number of MLC entries would be 11 (i.e. each MLC entry represents 32 KB of data in the 352 KB total MLC data). Moreover, assuming an FMU size of 8 sectors (e.g. 4 KB of data), the number of MLC FMU entries would be 8 (i.e. each MLC FMU entry represents 4 KB of data in a 32 KB MLC entry), and similarly, the number of RMW FMU entries would also be 8 (i.e. each RMW FMU entry represents 4 KB of data in the 32 KB total RMW data). While the above example identifies the number of MLC entries, MLC FMU entries, and RMW FMU entries as 11, 8, and 8 respectively, which will be referred to throughout the various steps of the flow chart of FIGS. 8A-8B, other values may be identified depending on the size of the MLC data, FMU data, and RMW data (which may respectively be different than 352 KB, 4 KB, and 32 KB in other examples).

Moreover, the controller may initialize an MLC context index (e.g. by setting it to 0). Thus, each entry in the MLC data may correspond to a particular index. For instance, assuming 352 KB of accumulated data, the MLC context corresponding to index 0 may include the first 32 KB of data, the MLC context corresponding to index 1 may include the second 32 KB of data, up to the number of MLC entries.

As represented by block 804, the controller may identify an MLC context corresponding to the current index. For example, the controller may initially identify the first 32 KB of MLC data for handling. Then, as represented by block 806, the controller may determine whether the current MLC context is sequential or part of a single stream. For example, the controller may check whether the logical addresses associated with the current 32 KB of MLC data being handled are in a single, sequential range (e.g. LBAs 0-63). If the current MLC context is a sequential pattern, the controller may make a single comparison of a single MLC context range with a RMW context range depending on whether the RMW context range itself is sequential or part of a single stream. Accordingly, as represented by block 808, the controller may check whether the RMW context is also sequential or part of a single stream. For example, the controller may check whether the logical addresses associated with the 32 KB of RMW data being handled are also in a single sequential range (e.g. LBAs 1000-1063). If the RMW context is also a sequential pattern, then as represented by block 810, the controller may obtain the LBA ranges of the MLC context and RMW context, and as represented by block 812, the controller may compare the LBA ranges to determine whether overlap exists. If the LBA ranges overlap, the controller may identify that overlap is detected as represented by block 814, and flush the MLC context to the SLC partition to prevent write ordering issues.

Based on the above example, the controller may obtain LBAs 0-63 for the current MLC context and LBAs 1000-1063 for the RMW context at block 810, and thus determine that the two LBA ranges do not overlap at block 812. Thus, as represented by block 816, the controller may increment the index of the current MLC context (corresponding to the next 32 KB of MLC data), and as represented by block 818, the controller may determine whether the current MLC context index is less than the number of MLC entries (i.e. whether any MLC data is left to be handled). If no other MLC data exists in the cache, then as represented by block 820, the controller may identify that no overlap was detected, and refrain from flushing the cache to the SLC partition. Otherwise, the controller may repeat the process described above starting from block 804 for the next MLC data context (e.g. the next 32 KB of MLC data).

In another example, the current MLC context may not be in a single, sequential range. For instance, the logical addresses associated with the 32 KB of MLC data being handled may include multiple patterns (e.g. LBAs 0-31 and LBAs 63-94). In such case, the controller may determine at block 806 that the current MLC context is not a sequential pattern. Thus, rather than making a single comparison of a single MLC context range with a RMW context range, the controller may individually compare multiple MLC FMUs with the RMW context range, depending on whether the RMW context range itself is sequential or part of a single stream. Accordingly, as represented by block 822, the controller may check whether the RMW context is sequential or part of a single stream (similar to block 808). For example, the controller may check whether the logical addresses associated with the 32 KB of RMW data being handled are in a single sequential range (e.g. LBAs 1000-1063) in contrast to the MLC data context. If the RMW context is a sequential pattern, then as represented by block 824, the controller may obtain the range of the RMW context (e.g. LBAs 1000-1063) for individual comparisons with each MLC FMU context. Moreover, the controller may initialize an MLC FMU context index (e.g. by setting it to 0). For instance, assuming a current MLC context of 32 KB and a 4 KB FMU size, the MLC FMU context corresponding to index 0 may include the first 4 KB of data of the 32 KB MLC context, the MLC FMU context corresponding to index 1 may include the second 4 KB of data of 32 KB, up to the number of MLC FMU entries.

Then, as represented by block 826, the controller may obtain the LBA range of the MLC FMU context, and as represented by block 828, the controller may compare the LBA ranges of the MLC FMU data context and the RMW data context to determine whether overlap exists. If the LBA ranges overlap, the controller may identify that overlap is detected as represented by block 814, and flush the MLC context to the SLC partition to prevent write ordering issues. Thus, in the above example, the controller may obtain LBAs 1000-1063 for the RMW context at block 824 and LBAs 0-8 for the current MLC FMU context at block 826, and thus determine that the two LBA ranges do not overlap at block 828. Thus, as represented by block 830, the controller may increment the index of the current MLC FMU context, and as represented by block 832, the controller may determine whether the current MLC FMU context index is less than the number of MLC FMU entries (i.e. whether any FMU data is left to be handled for that 32 KB MLC context). If there is FMU data remaining in the MLC context, the process described above repeats at block 826 for the next MLC FMU context (e.g. LBAs 8-15). Otherwise, if all the FMU data of the MLC context has been compared, then again as represented by block 816, the controller may increment the index of the current MLC context, and as represented by block 818, the controller may determine whether the current MLC context index is less than the number of MLC entries (i.e. whether any MLC data is left to be handled). If no other MLC data exists in the cache, then as represented by block 820, the controller may identify that no overlap was detected, and refrain from flushing the cache to the SLC partition. Otherwise, the controller may repeat the process described above starting from block 804 for the next MLC context.

Referring to FIG. 8B, in another example, the RMW context may not be in a single, sequential range. For instance, the logical addresses associated with the 32 KB of RMW data being handled may include multiple patterns (e.g. LBAs 1000-1031 and LBAs 1063-1094). In such case, the controller may determine at block 808 or 822 of FIG. 8A that the RMW context is not a sequential pattern. Thus, rather than making a single comparison of a single MLC context range with a single RMW context range, or individually comparing multiple MLC FMUs with the single RMW context range, the controller may individually compare a single MLC context range with multiple RMW FMUs (e.g. based on the determination at 808), or the controller may individually compare multiple MLC FMUs with multiple RMW FMUs (e.g. based on the determination at 822).

If the current MLC context is in a single, sequential range (e.g. LBAs 0-63), then as represented by 834, the controller may obtain the range of the MLC context (e.g. LBAs 0-63) for individual comparisons with each RMW FMU context. Moreover, the controller may initialize an RMW FMU context index (e.g. by setting it to 0). For instance, assuming a RMW context of 32 KB and a 4 KB FMU size, the RMW FMU context corresponding to index 0 may include the first 4 KB of data of the 32 KB RMW context, the RMW FMU context corresponding to index 1 may include the second 4 KB of data of 32 KB, up to the number of RMW FMU entries.

Then, as represented by block 836, the controller may obtain the LBA range of the RMW FMU context, and as represented by block 838, the controller may compare the LBA ranges of the RMW FMU data context and the MLC data context to determine whether overlap exists. If the LBA ranges overlap, the controller may identify that overlap is detected as represented by block 840, and flush the MLC context to the SLC partition to prevent write ordering issues. In the above example, the controller may obtain LBAs 0-63 for the current MLC context at block 834 and LBAs 1000-1007 for the RMW FMU context at block 836, and thus determine that the two LBA ranges do not overlap at block 838. Thus, as represented by block 842, the controller may increment the index of the current RMW FMU context, and as represented by block 844, the controller may determine whether the current RMW FMU context index is less than the number of RMW FMU entries (i.e. whether any FMU data is left to be handled for the 32 KB RMW context). If there is FMU data remaining in the RMW context, the process described above repeats at block 836 for the next RMW FMU context (e.g. LBAs 1008-1015). Otherwise, if all the FMU data of the RMW context has been compared, then again as represented by block 816, the controller may increment the index of the current MLC context, and as represented by block 818, the controller may determine whether the current MLC context index is less than the number of MLC entries (i.e. whether any MLC data is left to be handled). If no other MLC data exists in the cache, then as represented by block 820, the controller may identify that no overlap was detected, and refrain from flushing the cache to the SLC partition. Otherwise, the controller may repeat the process described above starting from block 804 for the next MLC context.

On the other hand, if the current MLC context is not in a single, sequential range (e.g. LBAs 0-31 and LBAs 63-94), then as represented by 846, the controller may initialize an MLC FMU context index (e.g. by setting it to 0). For instance, assuming a current MLC context of 32 KB and a 4 KB FMU size, the MLC FMU context corresponding to index 0 may include the first 4 KB of data of the 32 KB MLC context, the MLC FMU context corresponding to index 1 may include the second 4 KB of data of 32 KB, up to the number of MLC FMU entries. Then, as represented by 848, the controller may obtain the range of the current MLC FMU context (e.g. LBAs 0-7) for individual comparisons with each RMW FMU context. Moreover, the controller may initialize an RMW FMU context index (e.g. by setting it to 0). For instance, assuming a RMW context of 32 KB and a 4 KB FMU size, the RMW FMU context corresponding to index 0 may include the first 4 KB of data of the 32 KB RMW context, the RMW FMU context corresponding to index 1 may include the second 4 KB of data of 32 KB, up to the number of RMW FMU entries.

Then, as represented by block 850, the controller may obtain the LBA range of the RMW FMU context, and as represented by block 852, the controller may compare the LBA ranges of the RMW FMU data context and the MLC FMU data context to determine whether overlap exists. If the LBA ranges overlap, the controller may identify that overlap is detected as represented by block 840, and flush the MLC context to the SLC partition to prevent write ordering issues. In the above example, the controller may obtain LBAs 0-7 for the current MLC context at block 848 and LBAs 1000-1007 for the RMW FMU context at block 850, and thus determine that the two LBA ranges do not overlap at block 852. Thus, as represented by block 854, the controller may increment the index of the current RMW FMU context, and as represented by block 856, the controller may determine whether the current RMW FMU context index is less than the number of RMW FMU entries (i.e. whether any FMU data is left to be handled for the 32 KB RMW context). If there is FMU data remaining in the RMW context, the process described above repeats at block 850 for the next RMW FMU context (e.g. LBAs 1008-1015).

Otherwise, if all the FMU data of the RMW context has been compared, then as represented by block 858, the controller may increment the index of the current MLC FMU context, and as represented by block 860, the controller may determine whether the current MLC FMU context index is less than the number of MLC FMU entries (i.e. whether any FMU data is left to be handled for that 32 KB MLC context). If there is FMU data remaining in the MLC context, the process described above repeats at block 848 for the next MLC FMU context (e.g. LBAs 8-15). However, if all the FMU data of the MLC context has been compared, then again as represented by block 816, the controller may increment the index of the current MLC context, and as represented by block 818, the controller may determine whether the current MLC context index is less than the number of MLC entries (i.e. whether any MLC data is left to be handled). If no other MLC data exists in the cache, then as represented by block 820, the controller may identify that no overlap was detected, and refrain from flushing the cache to the SLC partition. Otherwise, the controller may repeat the process described above starting from block 804 for the next MLC context.

Figure 9:
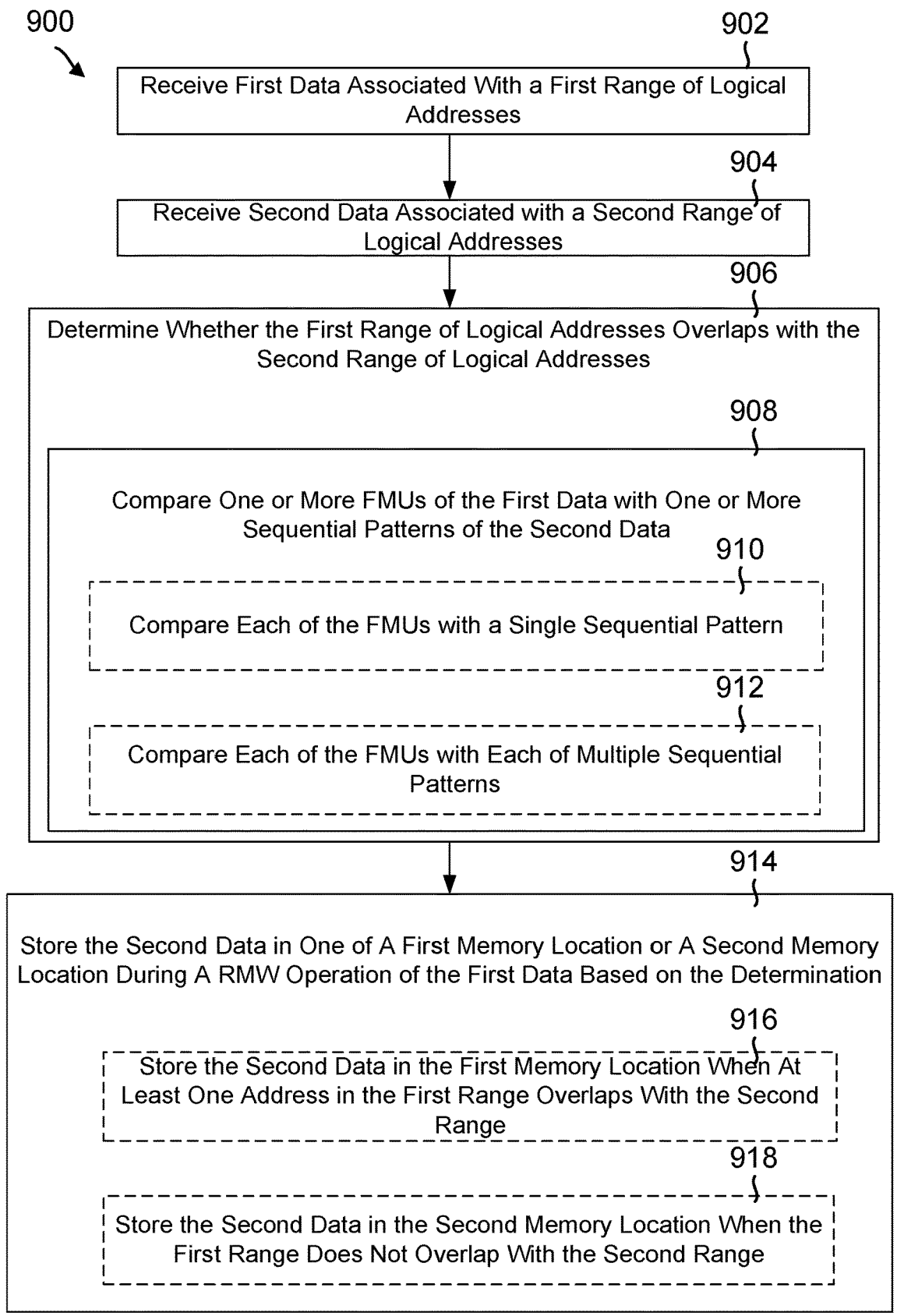
FIG. 9 is a flow chart illustrating another exemplary method of determining logical address range overlap during a RMW operation by the storage device of FIG. 1.

FIG. 9 illustrates an example flow chart 900 of a method for minimizing the flushing of data accumulated in cache during a RMW operation by determining overlap between logical address ranges of the accumulated data and the data read during RMW. For example, the method can be carried out in a storage device 102 such as the one illustrated in FIG. 1. Each of the steps in the flow chart can be controlled using the controller as described below (e.g. controller 123), or by some other suitable means.

As represented by block 902, the controller receives first data associated with a first range of logical addresses from a host device. The first data may comprise a FAT update. For example, referring to FIGS. 1-3, the controller may receive first data (e.g. data 119, FAT update data 310) associated with a first range of logical addresses 208. For instance, the first data may include a FAT update of 1-3 sectors (e.g. LBAs 2-4) that is received from a host device 104. The first data may also include AU data (e.g. one or more RUs 308 of AU 312) received from the host device that is read in a page from the NVM 110 during a RMW operation. For instance, if an FMU includes 8 sectors or logical addresses, the head portion of the FMU (e.g. LBAs 0-1 in the above example), the tail portion of the FMU (e.g. LBAs 5-7 in the above example), and/or other data in the page including the FMU may include AU data. Thus, the first data received from the host may include FAT updates, AU data, and data in FMUs or read pages. For instance, referring to FIGS. 8A-8B, the first data may include RMW data (e.g. a RMW context, such as data associated with LBAs 1000-1063 or another range that is read during RMW) or RMW FMU data (e.g. a RMW FMU context, such as data associated with LBAs 1000-1007 or another range within a RMW context).

As represented by block 904, the controller receives second data associated with a second range of logical addresses from the host device. The second data may comprise sequential data in one or more AUs. For example, referring to FIGS. 1-3, the controller may receive second data (e.g. data 119, RUs 308 of AU 312) associated with a second range of logical addresses 208. For instance, the second data may include AU data (e.g. one or more RUs 308 of AU 312) that is received from the host device and accumulated in cache 122 to be stored in the NVM 110 (e.g. in a MLC or TLC block). For instance, referring to FIGS. 8A-8B, the second data may include MLC data (e.g. a MLC context, such as data associated with LBAs 0-63 or another range within the accumulated cached data) or MLC FMU data (e.g. a MLC FMU context, such as data associated with LBAs 0-7 or another range within a MLC context).

As represented by block 906, the controller may determine whether the first range of logical addresses overlaps with the second range of logical addresses, e.g., as described with respect to FIGS. 8A-8B. For example, as represented by block 812, the controller may compare the LBA ranges of an MLC context and a RMW context to determine whether overlap exists. In another example, as represented by block 828, the controller may compare the LBA ranges of an MLC FMU context and a RMW context to determine whether overlap exists. In a further example, as represented by block 838, the controller may compare the LBA ranges of a RMW FMU context and the MLC context to determine whether overlap exists. In an additional example, as represented by block 852, the controller may compare the LBA ranges of an RMW FMU context and a MLC FMU context to determine whether overlap exists.

As represented by block 908, the controller may compare one or more FMUs of the first data with one or more sequential patterns of the second data, e.g., as described with respect to FIGS. 8A-8B. For example, if a MLC context is in a single, sequential range (e.g. data associated with a sequential pattern such as LBAs 0-63), then as represented by block 838, the controller may compare the LBA ranges of a RMW FMU context and the MLC context to determine whether overlap exists. In another example, if a MLC context is not in a single, sequential range (e.g. data associated with multiple sequential patterns such as LBAs 0-31 and LBAs 63-94), then as represented by block 852, the controller may compare the LBA ranges of an RMW FMU context and a MLC FMU context to determine whether overlap exists.

As represented by block 910, when the one or more sequential patterns comprise a single sequential pattern, the controller may compare each of the one or more FMUs of the first data with the single sequential pattern, e.g., as described with respect to FIG. 8B. For instance, the FMUs of the first data may include logical addresses associated with RMW FMU data (e.g. LBAs 1000-1007, 1008-1015), and the single sequential pattern may include a single range of logical addresses associated with a MLC context (e.g. LBAs 0-63). For example, after determining no overlap exists between a current RMW FMU context and a MLC context at block 838 and as represented by block 842, the controller may increment the index of the RMW FMU context. Then, as represented by block 844, the controller may determine whether the current RMW FMU context index is less than the number of RMW FMU entries (i.e. whether any FMU data is left to be handled for the 32 KB RMW context). If there is FMU data remaining in the RMW context, the process described above repeats at block 836 for the next RMW FMU context (e.g. LBAs 1008-1015), until all the FMU data of the RMW context has been compared with the MLC context.

As represented by block 912, when the one or more sequential patterns comprise multiple sequential patterns, the controller may compare each of the one or more FMUs of the first data with each pattern of the multiple sequential patterns, e.g., as described with respect to FIG. 8B. For instance, the FMUs of the first data may include logical addresses associated with RMW FMU data (e.g. LBAs 1000-1007, 1008-1015), the multiple sequential patterns may include separate ranges of logical addresses associated with a MLC context (e.g. LBAs 0-31 and LBAs 63-94), and each pattern may include a single range of logical addresses associated with a MLC FMU context (e.g. LBAs 0-7, LBAs 8-15, LBAs 63-70, LBAs 71-78, etc.). For example, after determining no overlap exists between a current RMW FMU context and a MLC FMU context at block 852 and as represented by block 854, the controller may increment the index of the RMW FMU context. Then, as represented by block 856, the controller may determine whether the current RMW FMU context index is less than the number of RMW FMU entries (i.e. whether any FMU data is left to be handled for the 32 KB RMW context). If there is FMU data remaining in the RMW context, the process described above repeats at block 850 for the next RMW FMU context (e.g. LBAs 1008-1015), until all the FMU data of the RMW context has been compared with the MLC FMU context. Then, then as represented by block 858, the controller may increment the index of the current MLC FMU context, and as represented by block 860, the controller may determine whether the current MLC FMU context index is less than the number of MLC FMU entries (i.e. whether any FMU data is left to be handled for that 32 KB MLC context). If there is FMU data remaining in the MLC context, the process described above repeats at block 848 for the next MLC FMU context (e.g. LBAs 8-15).

As represented by block 914, the controller may store the second data in one of a first memory location or a second memory location during a RMW operation of the first data based on the determination. The first memory location may comprise one or more single-level cells, and the second memory location may comprise one or more multiple-level cells. The one or more single-level cells may comprise a random partition, and the one or more multiple-level cells may comprise a TLC block. For example, referring to FIGS. 1-3 and 8A-8B, the controller may store the second data (e.g. data 119, RUs 308 of AU data, MLC data) in either the first memory location (e.g. memory location 112 including cells 116 of single-level cells, such as SLC random partition 406) or the second memory location (e.g. memory location 113 including a block 114 of cells 117 of multiple-level cells, such as a TLC block) based on the determination whether the first range of logical addresses 208 overlaps with the second range of logical addresses 208 described above with respect to blocks 907-912 and FIGS. 8A-8B. When the controller is performing a RMW operation as described above, the controller may either store the MLC data in the first memory location 112 (e.g. by flushing the accumulated data in cache 122 to the SLC random partition 406) when an overlap is detected, or the controller may store the MLC data in the second memory location 113 (e.g. by writing the accumulated data in cache 122 to the triple-level cells, such as in a single write of 384 KB) when no overlap is detected.

As represented by block 916, the controller may store the second data in the first memory location when at least one address in the first range of logical addresses overlaps with the second range of logical addresses. For example, referring to FIGS. 8A-8B, if the controller determines that the LBA ranges of the MLC context and the RMW context overlap as represented by block 812, or that the LBA ranges of the MLC FMU context and the RMW context overlap as represented by block 828, the controller may identify that overlap is detected as represented by block 814, and flush the MLC context to the SLC partition to prevent write ordering issues. Similarly, if the controller determines that the LBA ranges of the MLC context and the RMW FMU context overlap as represented by block 838, or that the LBA ranges of the MLC FMU context and the RWM FMU context overlap as represented by block 852, the controller may identify that overlap is detected as represented by block 840, and flush the MLC context to the SLC partition to prevent write ordering issues.

Finally, as represented by block 918, the controller may store the second data in the second memory location when the first range of logical addresses does not overlap with the second range of logical addresses. For example, referring to FIGS. 8A-8B and as represented by block 820, the controller may identify that no overlap was detected after comparing different LBA ranges according to blocks 906, 908, 910, and 912 described above. In such case, the controller may refrain from flushing the MLC data in the cache to the SLC partition and may write the data to the TLC block when sufficient data (e.g. 384 KB) is accumulated.

Accordingly, the present disclosure prevents excessive movement or flushing of accumulated MLC data in cache to a SLC partition for video patterns where sequential AU data is mixed with FAT data received from a host device. For instance, generally in video patterns where FAT data may be received with AU data (e.g. 2 MB), a significant amount of data (e.g. 17% in the example of 352 KB in for TLC blocks) may be repeatedly written to the SLC random partition resulting in multiple GC processes. By detecting whether data overlap exists, excessive flushing and GC may be reduced, thereby reducing write amplification from video patterns (e.g. by 17%). Moreover, the minimization of such flushing to cases when overlaps are detected may improve sustained sequential read performance of the storage device, since AU data may be sequentially written to the TLC blocks without being fragmented between SLC partitions and TLC blocks due to RMW operations, thereby preserving the continuity of the data. Moreover, by allowing for different overlap comparisons depending on the continuity of the data being searched, faster searching may be achieved (e.g. comparing LBAs between MLC contexts and RMW contexts may be faster than comparing LBAs between MLC FMU and RMW contexts, MLC contexts and RMW FMU contexts, and MLC RMU contexts and RMW FMU contexts).

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
   a memory including a first memory location and a second memory location, wherein the first memory location comprises one or more single level cells and the second memory location comprises one or more multiple level cells; and
   a controller configured to:
      receive first data associated with a first range of logical addresses and second data associated with a second range of logical addresses from a host device;
      determine whether the first range of logical addresses overlaps with the second range of logical addresses;
      store the second data in one of the first memory location or the second memory location during a read-modify-write (RMW) operation of the first data based on the determination;
      store the second data in the first memory location responsive to at least one address in the first range of logical addresses overlapping with the second range of logical addresses; and
      store the second data in the second memory location responsive to the first range of logical addresses not overlapping with the second range of logical addresses.

2. The storage device of claim 1, wherein the first data comprises a File Allocation Table (FAT) update, and wherein the second data comprises sequential data in one or more allocation units (AUs).

3. The storage device of claim 1, wherein the one or more single level cells comprise a random partition and the one or more multiple level cells comprise a triple level cell block.

4. The storage device of claim 1, wherein the controller is further configured to determine whether the first range of logical addresses overlaps with the second range of logical addresses by comparing one or more flash management units (FMUs) of the first data with one or more sequential patterns of the second data.

5. The storage device of claim 4, wherein the one or more sequential patterns comprise a single sequential pattern, and the controller is further configured to compare each of the one or more FMUs with the single sequential pattern.

6. The storage device of claim 4, wherein the one or more sequential patterns comprise multiple sequential patterns, and the controller is further configured to compare each of the one or more FMUs with each pattern of the multiple sequential patterns.

7. The storage device of claim 1, wherein the controller is further configured to refrain from storing the second data in the first memory location during the RMW operation responsive to the first range of logical addresses not overlapping with the second range of logical addresses.

8. The storage device of claim 2, wherein the controller is further configured to refrain from storing the second data in the first memory location during the RMW operation responsive to the first range of logical addresses not overlapping with the second range of logical addresses.

9. The storage device of claim 4, wherein the controller is further configured to refrain from storing the second data in the first memory location during the RMW operation responsive to the first range of logical addresses not overlapping with the second range of logical addresses.

10. A storage device, comprising:
  a memory including a first memory location and a second memory location, wherein the first memory location comprises one or more single level cells and the second memory location comprises one or more multiple level cells; and
  a controller configured to:
    receive first data associated with a first range of logical addresses and second data associated with a second range of logical addresses from a host device;
    determine whether the first range of logical addresses overlaps with the second range of logical addresses;
    store the second data in the first memory location during a read-modify-write (RMW) operation of the first data responsive to at least one address in the first range of logical addresses overlapping with the second range of logical addresses; and
    store the second data in the second memory location during the RMW operation of the first data responsive to the first range of logical addresses not overlapping with the second range of logical addresses.

11. The storage device of claim 10, wherein the first data comprises a File Allocation Table (FAT) update, and wherein the second data comprises sequential data in one or more allocation units (AUs).

12. The storage device of claim 10, wherein the one or more single-level cells comprise a random partition and the one or more multiple-level cells comprise a triple level cell block.

13. The storage device of claim 10, wherein the controller is further configured to determine whether the first range of logical addresses overlaps with the second range of logical addresses by comparing one or more flash management units (FMUs) of the first data with one or more sequential patterns of the second data.

14. The storage device of claim 13, wherein the one or more sequential patterns comprise a single sequential pattern, and the controller is further configured to compare each of the one or more FMUs with the single sequential pattern.

15. The storage device of claim 13, wherein the one or more sequential patterns comprise multiple sequential patterns, and the controller is further configured to compare each of the one or more FMUs with each pattern of the multiple sequential patterns.

16. The storage device of claim 10, wherein the controller is further configured to refrain from storing the second data in the first memory location during the RMW operation responsive to the first range of logical addresses not overlapping with the second range of logical addresses.

17. The storage device of claim 11, wherein the controller is further configured to refrain from storing the second data in the first memory location during the RMW operation responsive to the first range of logical addresses not overlapping with the second range of logical addresses.

18. The storage device of claim 12, wherein the controller is further configured to refrain from storing the second data in the first memory location during the RMW operation responsive to the first range of logical addresses not overlapping with the second range of logical addresses.

19. A storage device, comprising:
  a memory including a first memory location and a second memory location, wherein the first memory location comprises one or more single level cells and the second memory location comprises one or more multiple level cells; and
  means for storing first data associated with a first range of logical addresses in one of the first memory location or the second memory location during a read-modify-write (RMW) operation of second data associated with a second range of logical addresses, wherein the first data is stored in the first memory location in response to a determination that the first range of logical addresses overlaps with the second range of logical addresses, and the first data is stored in the second memory location in response to a determination that the first range of logical addresses does not overlap with the second range of logical addresses.

* * * * *